United States Patent [19]

Junker

[11] Patent Number: 4,994,311
[45] Date of Patent: Feb. 19, 1991

[54] TRIMMING SEALING AND FINISHING STRIPS

[75] Inventor: Bernd Junker, Viersen, Fed. Rep. of Germany

[73] Assignee: Draftex Industries Limited, Edinburgh, Scotland

[21] Appl. No.: 380,869

[22] Filed: Jul. 17, 1989

[30] Foreign Application Priority Data

Jul. 18, 1988 [GB] United Kingdom ............... 8817088

[51] Int. Cl.⁵ .............................................. E06B 7/16
[52] U.S. Cl. .................................... 428/122; 49/475; 49/490; 296/93; 428/358
[58] Field of Search .................. 428/122, 358; 296/93; 49/475, 490

[56] References Cited

U.S. PATENT DOCUMENTS

| | | | |
|---|---|---|---|
| 3,958,043 | 5/1976 | McKee, Jr. et al. | 428/161 X |
| 4,253,543 | 3/1981 | Johansson | 428/160 X |
| 4,278,483 | 7/1981 | Mansolillo | 428/207 X |
| 4,323,661 | 4/1982 | Kraus et al. | 525/259 |
| 4,351,869 | 9/1982 | Cresap | 428/121 |
| 4,442,156 | 4/1984 | Yamaguchi | 49/475 X |
| 4,448,835 | 5/1984 | Yamaguchi | 428/122 X |
| 4,511,526 | 4/1985 | Yamaguchi | 428/122 X |
| 4,513,044 | 4/1985 | Shigeki et al. | 428/122 |
| 4,568,405 | 2/1986 | Lin | 428/524 X |
| 4,594,289 | 6/1986 | Clark et al. | 428/358 |
| 4,636,547 | 1/1987 | Engelmann et al. | 525/80 X |
| 4,865,917 | 9/1989 | Lindner et al. | 428/407 |

FOREIGN PATENT DOCUMENTS 1090462 11/1967 United Kingdom .
1121082 7/1968 United Kingdom .
1186569 4/1970 United Kingdom .

*Primary Examiner*—Henry F. Epstein
*Attorney, Agent, or Firm*—Leydig, Voit & Mayer

[57] ABSTRACT

A window channel receives a slidable pane of window glass within a gap. The glass slides in contact with areas which are coated with low friction material which is applied by sintering. For example, the sintered material may be powdery polyurethane, polypropylene or polyamide. The sintered powders may be transparent and may be applied after the areas have been coated with a solvent or primer. Using similar materials, but with colored powders, the exposed surfaces of door and other seals may be provided with a colored coating.

6 Claims, 2 Drawing Sheets

TRIMMING SEALING AND FINISHING STRIPS

BACKGROUND OF THE INVENTION

The invention relates to trimming, sealing and finishing strips.

Such strips may be used, for example, in motor vehicle body construction. One example of such use is for sealing around closable openings such as door openings, luggage compartment openings and engine compartment openings. Such openings may have a surrounding metal flange, formed by the actual body construction, and the strip may be channel-shaped or may have a channel-shaped part which embracingly grips the flange so as to trim or finish the flange. Such a channel-shaped strip may also support a softer sealing part for carrying out a sealing function. It is often desirable in such sealing strips to provide them with some form of decorative finish which may be coloured to match the colour of the interior trim of the vehicle Such strips may also be used to seal against movable panels such as sliding glass windows. For example, there are many applications in motor vehicle body construction where slidable glass window panes are required to slide against sealing strips. Such sealing strips need to make a substantially weather-proof seal against the window glass. At the same time, however, the friction between the window glass and the sealing strip should be as low as possible.

BRIEF SUMMARY OF THE INVENTION

According to the invention, there is provided a strip having a surface of plastics or rubber material which has further material applied to it by sintering.

According to the invention, there is further provided a method of making a strip with a decorative and/or low friction surface, comprising the step of producing the strip from plastics or rubber and characterised by the step of applying further material to the surface by sintering.

BRIEF DESCRIPTION OF THE DRAWINGS

Sealing strips embodying the invention will now be described, by way of example only, with reference to the accompanying diagrammatic drawing in which.

DESCRIPTION OF PREFERRED EMBODIMENTS

Figure 1:
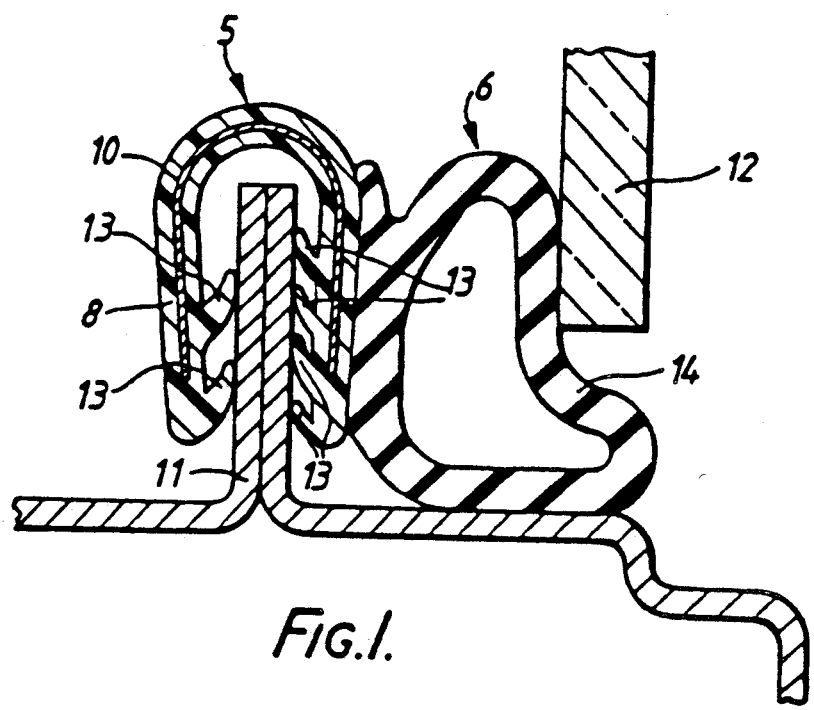
FIG. 1 is a cross-section through a motor vehicle body sealing strip taken on the line I—I of FIG. 2.
Figure 2:
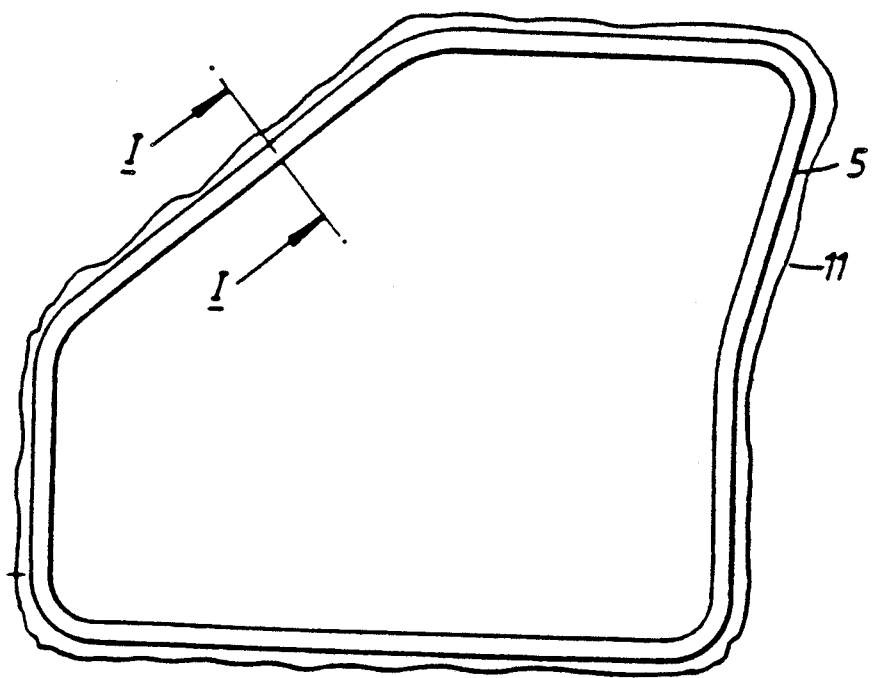
FIG. 2 is a side view showing a vehicle door opening.

As shown in FIG. 1, a sealing strip for a motor vehicle body opening as shown in FIG. 2 comprises a channel-shaped gripping part 5 and a soft sealing part 6. The gripping part 5 comprises plastics or rubber material 8 covering a channel-shaped metal core or carrier 10. The metal carrier 10 can take any suitable form. For example, it may be a simple metal channel. Instead, it can be slit or slotted or made of entirely separate U-shaped elements Another possibility is to construct it from wire. It may be incorporated into the plastics or rubber material 8 by extruding the latter over the carrier using a cross-head extruder.

The gripping part 5 embracingly grips over a flange 11 (see FIG. 2 also) formed in the bodywork of the vehicle and surrounding the opening so as to be directed inwardly of the opening and substantially co-planar therewith. In order to assist the gripping part 5 in gripping on the flange 11, the plastics or rubber material 8 is co-extruded with gripping lips 13.

An outside wall of the gripping part 5 carries the softer sealing part 6 which may be adhesively secured to it or co-extruded with it. The sealing part 6 is made of sponge rubber 14. In use, the vehicle door 12 closes onto the sealing part 6, partially compressing it so as to provide the necessary sealing action.

It will be appreciated that the greater part of the outer surface of the gripping part 5, that is, the part not carrying the sealing part 6, is visible from the interior of the vehicle by the driver and passengers. It is thus desirable to provide this surface with a decorative finish so as to match or possibly contrast with the trim on the interior of the vehicle. It is known to achieve such a decorative finish by "printing" or embossing the surface of the gripping part. Instead of, or in addition, it is known that the extruded material may be inherently coloured by means of suitable additives which are incorporated into the basic plastics or rubber mix. However, these possibilities may be expensive and/or unsatisfactory for various reasons. A further known possibility is to attach coloured cloth to the external surface of the gripping part. However, this also is expensive and labour-intensive.

In order to avoid or reduce these disadvantages, therefore, the sealing strip being described is decorated over some or all of the exposed external surface of the gripping part 5 by means of a sintering process. In accordance with this process, a solvent or primer is first applied to the surface of the gripping part which is to be decorated. The material to be sintered onto the surface is then applied in powder form such as being allowed to drop onto the coated surface of the gripping part and thus adhere to the solvent or primer-treated surface. Sintering then takes place by means of the application of heat to the powder on the surface of the gripping part, such heat being applied (for example) by means of hot air. This melts the powder and thus sinters it into position. Excess powder is then removed such as by means of an air blast.

The powder used in the sintering process may comprise powdery thermoplasts, half cross-linked powdery products (for example, thermoplastic rubber), or cross-linked powdery elastomers. Examples of such powders are polyurethane, polypropylene and polyamide powders. They are suitably coloured to give the necessary decorative colour finish. The surface of the gripping part may be printed or embossed before the sintering process.

Where the gripping part is made of rubber, it is preferably not cured using the salt bath method because the contamination of the surface which this may cause may hinder the sintering process. Curing by hot air or UHF radiation is therefore preferable.

Figure 3:
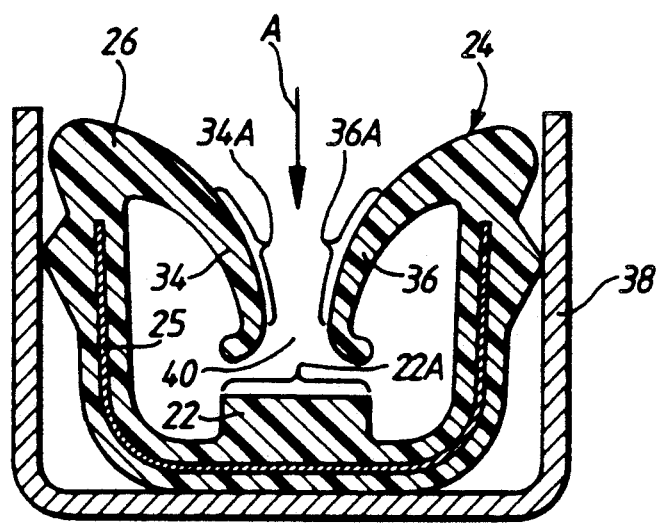
FIG. 3 is a cross-section through a motor vehicle window channel.

As shown in FIG. 3, the window channel 24 comprises a channel-shaped metal core or carrier 25 embedded in plastics or rubber material 26. The metal carrier can take any suitable form, such as described above.

The plastics or rubber material 26 is formed with a raised base part 22 and inwardly directed lips 34,36. The window channel is mounted, in the vehicle by being a press-fit in an outer metal channel 38.

Where such a window channel is used in, for example, a window opening in a vehicle door, the channel will be arranged along the sides of the window opening and along the top. The window glass itself is received within the opening 40 so that the areas 34A and 36A on the outer surfaces of the lips 34 and 36 bear against opposite sides of the window glass adjacent its periphery, and the peripheral edge of the window glass is received by the area 32A on the base 32. Along the sides of the window opening, therefore, the window glass slides longitudinally along the length of the channel and thus in a corresponding direction along the areas 32A,34A and 36A. Along the top of the window opening, the window glass enters the channel as the window is closed, the window glass entering in the direction of the arrow A and thus sliding over the areas 34A and 36A and then moving into contact with the area 32A.

Where the window glass descends into the interior of the door, below the window opening, it will pass between two separate sealing strips or "waist belts" which may be made of extruded plastics or rubber material and which respectively present areas corresponding to the areas 34A and 36A and making contact with opposite sides of the window glass.

It will be understood that the areas making contact with the window glass need to make good sealing contact therewith so as to produce efficient sealing against ingress of water, moisture and drafts and also to reduce wind noise. In addition, however, the areas contacting the window glass must do so with the minimum of friction in order to reduce the effort required to raise or lower the window glass.

In order to achieve such sealing and low friction, the areas 32A,34A and 36A, and the corresponding areas on waist belts, are treated by means of a sintering process similar to that described above and using similar materials.

The sintering process is such as to produce very small "dots" of the sintered material on the low friction areas. The contact made with the sliding glass is therefore point-contact, rather than area-contact, and this reduces the friction. Because the sintering process produces these "dots" of material, dirt which may be present can pass through the pattern of dots and is not smeared over the glass (provided that the dirt grains are below a certain size).

The areas 32A,34A and 36A may be treated with a solvent or primer in the same way as for the sealing strip of FIG. 1. The material used in the sintering process for the window seal of FIG. 3 is advantageously transparent.

The sintering process described (whether for the sealing strip of FIG. 1 or the window channel of FIG. 3) can be applied to non-cross-linked, semi-cross-linked and fully cross-linked materials (that is, to polyvinyl chloride materials, thermoplastic rubbers, and EPDM materials, respectively, for example).

The sintering process described can be carried out continuously or discontinuously.

What is claimed is:

1. A strip having a surface of plastics or rubber material carrying further material applied to the surface by sintering, the sintered material being selected from one of the group consisting of a powdery thermoplast, a semi-cross-linked powdery product, and a cross-linked powdery elastomer.

2. A strip according to claim 1, in which the sintered material is coloured.

3. A sealing strip according to claim 1, for sealing against a movable panel sliding in contact with it, in which the surface is flexible and the sintered material is in sliding contact with the movable panel in use.

4. A strip according to claim 3, in which the sintered material is transparent.

5. A strip according to claim 1, in which the surface on which the said material is sintered is covered with a solvent or primer before applying the further material by sintering.

6. A strip according to claim 1, in which the sintered material is selected from one of the group consisting of powdered polyurethane, polypropylene and polyamide.

* * * * *